United States Patent
Park

Patent Number: 5,775,257
Date of Patent: Jul. 7, 1998

[54] BIRD FEEDER

[76] Inventor: Hong Ku Park, 203 Southcrest Dr., Huntsville, Ala. 35802

[21] Appl. No.: 845,108

[22] Filed: Apr. 21, 1997

[51] Int. Cl.$^6$ .................................................. A01K 39/01
[52] U.S. Cl. ........................................ 119/57.8; 119/52.2
[58] Field of Search ................................ 119/52.1, 52.2, 119/52.3, 57.8, 57.9

[56] References Cited

U.S. PATENT DOCUMENTS

| | | | |
|---|---|---|---|
| 993,630 | 5/1911 | Worsham et al. | 119/52.1 |
| 2,786,446 | 3/1957 | Newman | 119/52.2 |
| 2,890,681 | 6/1959 | Sack | 119/52.3 |
| 2,896,575 | 7/1959 | Scruggs | 119/57.9 |
| 3,090,354 | 5/1963 | Merritt et al. | 119/52.3 X |
| 3,136,296 | 6/1964 | Luin | 119/52.2 |
| 5,063,877 | 11/1991 | Riggi | 119/52.2 |
| 5,596,946 | 1/1997 | Bryant et al. | 119/52.1 |

*Primary Examiner*—Robert P. Swiatek
*Assistant Examiner*—Elizabeth Shaw
*Attorney, Agent, or Firm*—John C. Garvin, Jr.

[57] ABSTRACT

A bird feeding device comprising a hollow container for holding food and having a plurality of food dispensing openings therein; a conically shaped member within the hollow container for spreading the food towards the plurality of food dispensing openings in the hollow container; a saw tooth insert for assisting in the spreading of the food towards the plurality of food dispensing openings in the hollow container; a plurality of perches, each being in alinement with a respective food dispensing opening in the hollow container for supporting a bird when eating from the feeding device; and a chain or rope for supporting or suspending the feeding device. Each food dispensing opening in the hollow food container has an upper edge with an inwardly extending top ear and a pair of inwardly extending side ears which tend to keep food within the container and not falling through the opening.

20 Claims, 2 Drawing Sheets

BIRD FEEDER

The present invention relates to the field of devices for feeding animals, and more particularly to devices which are hung on a tree or supported on a pole for feeding relatively small birds, such as finches, chickadees, blue birds, etc.

BACKGROUND OF THE INVENTION

The present invention relates to a novel feeder for birds common to a particular region which automatically dispenses food such as sun flower seeds, corn or a mixture of different types of feed and prevents wasting of the feed.

While the prior art encompasses numerous devices for automatically dispensing feed to fowl, such devices have numerous defects and disadvantages which are obviated by the present invention. The following United States patents are exemplary of such prior art devices: 2,464,644 to Kwosh; 2,667,858 to Cussotti; 2,804,844 to Gigliotti; 4,691,665 to Hefner; 4,732,112 to Fenner et al.; 5,062,388 to Kilham; and 5,095,847 to Coffer.

The patent to Kwosh discloses a chick feed container including a base pan with an upwardly flared outer side wall; a vertical cone shaped member connected to the base pan; a cylindrical reservoir for holding feed to be dispensed by gravity to the base pan; and a sloped cover for the cylindrical reservoir for allowing feed to be introduced to the reservoir and for preventing rain or the like from entering the base pan and damping the feed. The patent to Cussotti discloses a poultry feeder including a cone-shaped member with a frusto-conical element which extends upwardly and outwardly from the base of the cone-shaped member; a cylindrical hopper secured to the cone-shaped member for holding feed, the hopper having a plurality of circumferentially spaced apertures dispensed in a ring around its lower end for allowing chickens to peck feed through the apertures; and a hood assembly. The patent to Gigliotti discloses a device for feeding pigeons including an annular feed pan having a perforated peripheral wall; a cylindrical feed hopper attached to the annular feed pan and having a conical bottom, a plurality of spaced openings for dispensing feed from the hopper, and a plurality of spaced tabs for controlling the amount of feed being dispensed to the feed pan; an annular platform on which the pigeons rest while feeding; a conical lid; and a standard for supporting the feed pan, the hopper and platform. The patent to Hefner discloses a hummingbird feeder for dispensing nectar, which is usually a sugar-water solution which is attractive to insects such as ants as well as hummingbirds, which includes a plurality of perches for the hummingbirds to stand upon; and means for keeping insects such as ants from contaminating the nectar. The patent to Fenner et al. discloses a bird feeder including a feed reservoir; a cover secured to the feed reservoir; a conduit having a plurality of dispensing ports; a cup secured to the conduit; and a perch secured to the cup for birds to light and stand while feeding. The patent to Kilham discloses a feeding device for small birds including a cylindrical housing or reservoir; a first ring member having a plurality of circumferentially spaced apertures therein; a second ring member having a plurality of circumferentially spaced apertures therein; a tray assembly having a domed, sloped, wall, and a ledge for birds to stand on when pecking feed from the apertures in the first and second ring members. The patent to Coffer discloses a bird feeder including a vertical feed chamber having a plurality of spaced feed openings therein; a plurality of perches below the spaced feed openings for birds to stand upon when feeding; and a second chamber below the perches for catching any feed that may fall from the vertical feed chamber.

SUMMARY OF THE INVENTION

The present invention provides an animal feeding device that is particularly usable for feeding birds and which includes a container which defines a food reservoir for holding food to be automatically dispensed therefrom.

The animal feeding device preferably comprises a hollow container for holding food and having a plurality of food dispensing openings therein; a conically shaped member within the hollow container for spreading the food towards the plurality of food dispensing openings in the hollow container; a saw tooth insert for assisting in the spreading of the food towards the plurality of food dispensing openings in the hollow container; a plurality of perches, each being in alinement with a respective food dispensing opening in the hollow container for supporting a bird when eating from the feeding device; and a chain or rope for supporting or suspending the feeding device. Each food dispensing opening in the hollow food container has an upper edge with an inwardly extending top ear or tab and a pair of inwardly extending side ears or tabs which keep food within the container and not falling through the opening.

In accordance with the present invention, a unique bird feeding device is provided that can be made from relatively inexpensively parts and which prevents the wasting of food.

It is an object of the present invention to provide an animal feeding device wherein feed such as seed, corn or the like can be readily and easily placed therein for dispensing to animals such as birds for the feeding thereof so that the birds will continually have feed before them until the feed has been practically consumed.

It is a further object of the present invention to provide a bird feeding device which is simple in construction, inexpensive to manufacture, and which dispenses feed automatically without undue waste.

It is still a further object of the present invention to provide a bird feeding device which dispenses food automatically without undue waste, and can be inexpensively constructed mostly from beverage containers which are normally disposed of as solid waste.

These objects as well as other objects of the present invention will become more readily apparent after reading the following description in conjunction with the accompanying drawings and claims.

DETAILED DESCRIPTION OF THE PREFERRED EMBODIMENT

Figure 1:
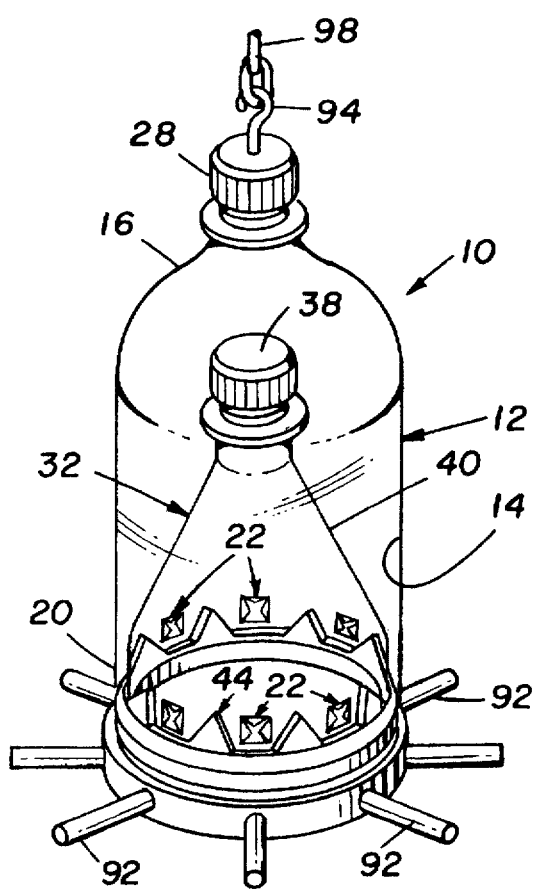
FIG. 1 is a perspective view of the bird feeder of the present invention.
Figure 2:
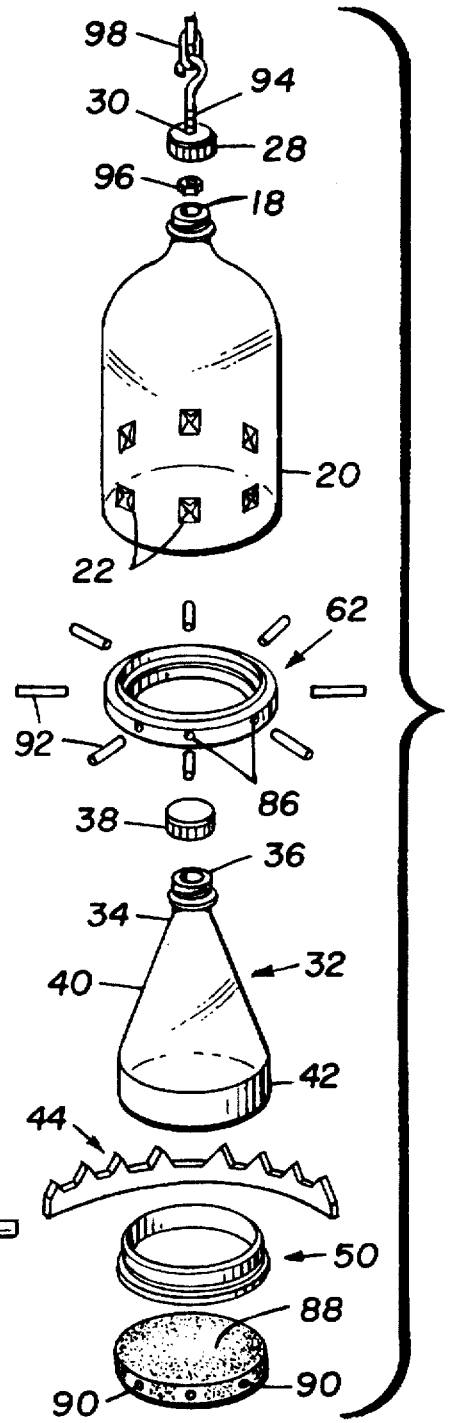
FIG. 2 is a front elevational, exploded, view of the bird feeder of the present invention.

Referring to drawings, particularly FIGS. 1 and 2 thereof, reference numeral 10 generally designates the preferred embodiment of the bird feeder of the present invention. Still referring to FIGS. 1 and 2, bird feeder 10 generally comprises a hollow container 12, a hollow conically shaped feed spreader 32, a saw tooth insert 44, a hollow inner insert 50, a hollow outer sleeve 62, a floor 88, a plurality of pegs or perches 92, an externally threaded eyebolt 94, an internally threaded nut 96, and a chain or rope 98.

Figure 7:
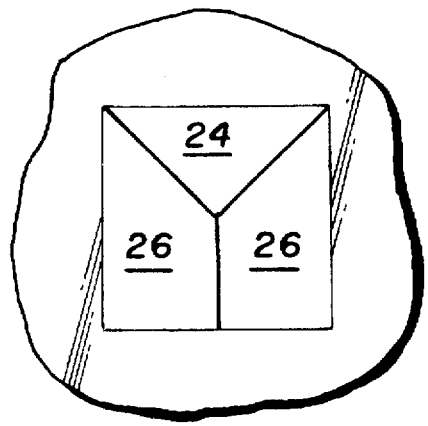
FIG. 7 is a front elevational view of one of the openings through which birds peck feed, but showing the opening closed by the upper ear and two side ears.
Figure 8:
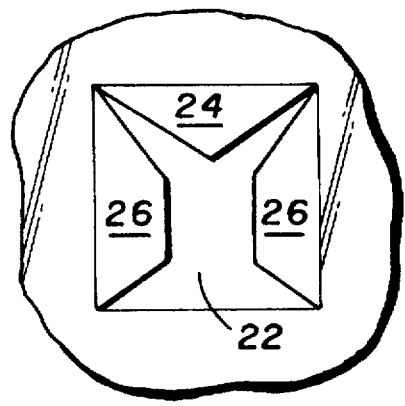
FIG. 8 is a front elevational view of one of the openings through which birds peck feed with the upper ear and two side ears being shown in their flared or opened condition.

As best seen in FIGS. 1 and 2, hollow container 12 includes an inner wall 14; an upper section 16 having an opening 18 surrounded by external threads (not numbered); a lower section 20 having a plurality of circumferentially spaced openings 22 therein and having on its upper edge a flared upper ear 24 (FIGS. 7 and 8) and on each of its side edges a flared side ear 26 (FIGS. 7 and 8); and an internally threaded cap 28 having an opening 30 therein.

As still best seen in FIGS. 1 and 2, the hollow conically-shaped spreader 32 includes an upper section 34 having an opening 36 surrounded by external threads (not numbered); an internally threaded cap 38; a tapered outer wall 40; and a cylindrical lower section 42.

Figure 3:
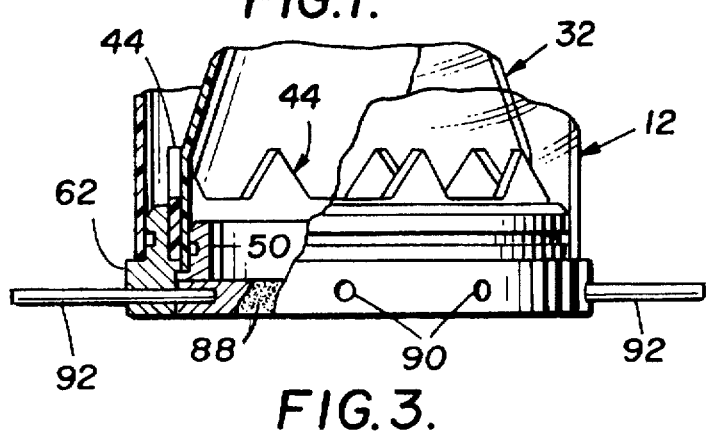
FIG. 3 is a front elevational, partially broken away and in section, view showing the mating of the hollow container, the hollow conically-shaped spreader, the saw tooth insert, the hollow inner insert, the hollow outer sleeve, the floor and the perches or pegs of the bird feeder of the present invention.
Figure 6:
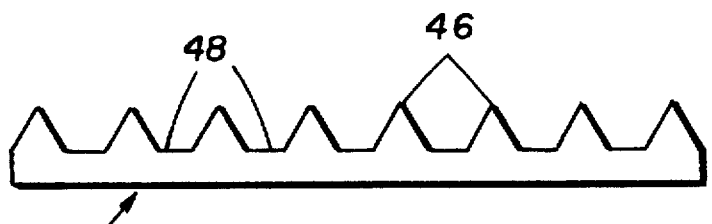
FIG. 6 is a front elevational view of the saw tooth insert in a flat condition.

As best seen in FIGS. 2, 3 and 6, saw tooth insert 44 includes a plurality of equally spaced peaks 46 and valleys 48 on its upper edge with its lower edge (not numbered) being generally straight. The purpose of saw tooth insert 44 will be explained later.

Figure 5:
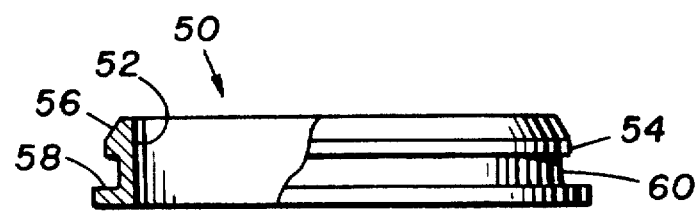
FIG. 5 is a front elevational, partially broken away and in section, view showing the details of the hollow inner insert.

As best seen in FIG. 5, hollow inner insert 50 includes a central opening 52; an outer annular surface 54 having a tapered upper section 56, an enlarged annular shoulder 58 and a groove 60 between outer annular surface 54 and enlarged annular shoulder 58.

Figure 4:
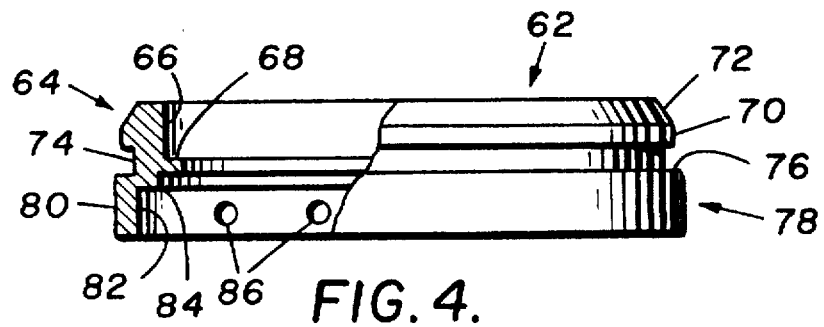
FIG. 4 is a front elevational, partially broken away and in section, view showing the details of the hollow outer sleeve.

As best seen in FIG. 4, hollow outer sleeve 62 includes an upper section 64 having an inner opening 66, an inwardly extending annular ledge 68, and an annular outer portion 70 with a tapered portion 72, a groove 74 and an outwardly extending shoulder 76; a lower section 78 having an outer cylindrical portion 80, an inner opening 82, an inwardly extending shoulder 84; and a plurality of circumferentially spaced, radially extending, openings 86 in the outer cylindrical portion 80 of outer sleeve 62.

As best seen in FIGS. 2 and 3, floor 88 is cylindrical in shape and incorporates a plurality of circumferentially spaced apertures 90 in its outer edge, the spacing of the apertures 90 being in alinement with the circumferentially spaced openings 86 in hollow outer sleeve 62.

The several components of bird feeder 10 is best assembled from its exploded, separated, condition as shown in FIG. 2 to its assembled, joined, condition as shown in FIGS. 1 and 3 in the following order:

a. The tapered upper section 56 and the outer surface 54 of inner insert 50 is inserted within the cylindrical lower section 42 of generally conically-shaped spreader 32 until the lower edge (not numbered) of cylindrical lower section 42 engages the top of enlarged, annular, shoulder 58 of inner insert 50.

b. The hollow outer sleeve 62 is inserted from above over the generally conically shaped spreader 32 and the inner insert 50 until the inwardly extending ledge 68 engages the upper edge (not numbered) of enlarged, annular, shoulder 58 of inner insert 50.

c. The floor 88 is inserted into the opening 82 of lower section 78 of outer sleeve 62 until its upper edge (not numbered) engages the underside (not numbered) of enlarged annular shoulder 58 of hollow inner insert 50 with the circumferentially spaced apertures 90 of floor 88 being placed in alinement with the circumferentially spaced openings 86 in lower section 78 of outer sleeve 62, at which time a perch or peg 92 is inserted in each opening 86 and 90.

d. The saw tooth insert 44 is inserted into the gap (not numbered) formed between the outer surface (not numbered) of cylindrical lower section 42 of generally conically shaped spreader 32 and the surface of central opening 66 of outer sleeve 62 until the lower edge (not numbered) of saw tooth insert 44 engages the upper surface (not numbered) of enlarged annular shoulder 58 of inner insert 50.

e. The container 12 is inserted over the generally conically-shaped spreader 32 and the tapered portion 72 and the annular outer portion 70 of outer sleeve 62 until the lower edge (not numbered) of lower section 20 of container 12 engages the outwardly extending shoulder 76 of outer sleeve 62, after which the container 12 in rotated until the center of each circumferentially spaced opening 22 in lower section 20 of container 12 is in alinement with a respective valley 48 of saw tooth insert 44.

f. Pressure is applied to each of upper ear 24 and side ears 26 to flare them inwardly to form the openings 22.

g. Container 12 is filled with seed or corn by pouring same through opening 18 of container 12 with the seed or corn being spread outwardly toward the openings 22 of container 12 due to the generally conical-shape of spreader 32.

h. The threaded eyebolt 94 is inserted through the central opening 30 in cap 28 and threaded nut 96 is threadedly engaged with the threads on eyebolt 94 to secure cap 28 to eyebolt 94.

i. The eyebolt 94 is then engaged to chain or rope 98 for suspension of bird feeder 10 from a tree limb or a standard.

When assembled as shown in FIG. 1 and with bird feed within the container 12, the combination of gravity and the tapered outer wall 40 of the conically shaped spreader 32 together with the saw tooth insert 44 forces the feed out towards the inner wall 14 of container 12 and the plurality of openings 22 in lower section 20 of container 12 so that a bird standing on one of the pegs or perches 92 can peck feed from container by inserting his/her bill within an opening 22. The flared condition of upper ear 24 and the two side ears 26 keep the feed from falling from container 12 and being wasted.

It has been found that the several parts of bird feeder 10 can be held together by friction fit; however, such parts might be secured together by a suitable adhesive. It has also been found that both the container 12 and the generally conically-shaped spreader 32 can be made of used, plastic, soft-drink bottles of the two and/or three liter size.

While a particular embodiment of this invention has been shown in the drawings and described above, it will be apparent, that many changes may be made in the use of materials, form, arrangement and positioning of the various elements of the bird feeder. For example, to provide rigidity to the lower section 20 of container or reservoir 12 and/or to prevent possible damage made by birds or other animals to the ears 24 and 26, the container or reservoir 12 could be made of a material (such as thicker plastic or metal) more durable than used plastic beverage containers, or an insert made of metal or a more durable plastic having an aperture 22 and its ears 24 and 26 built therein could be provided. In consideration thereof it should be understood that the preferred embodiment of the invention disclosed herein is intended to be illustrative only and not intended to limit the scope of the invention.

I claim:

1. A bird feeder comprising:
   a reservoir for holding a supply of feed, said reservoir including an upper end having a neck portion with an opening therein and closure means, a lower end having a central opening and a plurality of spaced apertures, and a side wall between said upper end and said lower end;
   means for directing feed from said reservoir to its said plurality of spaced apertures including an inner spreader member having an upper end, a lower end, and a tapered outer wall;
   means for closing said lower ends of said reservoir and said inner spreader member, said means including inner insert means positioned within said lower end of said inner spreader member and a hollow outer sleeve positioned within said lower end of said reservoir and outside of said lower end of said inner spreader member; and
   bird perch means associated with said outer sleeve below said plurality of spaced apertures in said reservoir so that birds can comfortably stand and feed.

2. The bird feeder of claim 1 wherein each of said apertures in said lower end of said reservoir is defined by a plurality of spaced, inwardly protruding, tabs.

3. The bird feeder of claim 2 wherein two of said spaced, inwardly protruding, tabs form the side edges of each said aperture.

4. The bird feeder of claim 3 wherein a third one of said spaced, inwardly protruding tabs form the top edge of said aperture.

5. The bird feeder of claim 4 wherein said inwardly protruding tabs prevent feed within said reservoir from falling from said reservoir through said apertures and being wasted.

6. The bird feeder of claim 5 wherein said hollow outer sleeve includes an inner opening and said means for closing said lower ends of said reservoir and said inner spreader member further includes a floor mounted within said inner opening of said outer hollow sleeve.

7. The bird feeder of claim 6 wherein each of said outer sleeve and said floor includes a plurality of radially extending openings for receiving said bird perch means.

8. The bird feeder of claim 7 wherein said means for directing feed from said reservoir to its said plurality of spaced apertures further includes a saw tooth insert having a plurality of peaks and valleys and wherein said valleys are disposed for alinement with a respective aperture in said lower end of said reservoir.

9. The bird feeder of claim 8 wherein said reservoir is generally in the shape of a cylinder and said inner spreader member is generally in the shape of a cone.

10. The bird feeder of claim 8 further including means associated with said closure means for the suspension of the bird feeder.

11. The bird feeder of claim 10 wherein said suspension means includes a filament connected to said closure means.

12. The bird feeder of claim 11 wherein said bird perch means comprise a plurality of pegs.

13. A bird feeder comprising:
    a reservoir for holding a supply of feed, said reservoir including an upper section having a neck portion with an opening therein for the introduction of feed into the reservoir, a cylindrical middle section, a cylindrical lower section having a central opening and a plurality of spaced apertures, and means removably mounted on said neck portion for closing said upper section of said reservoir;
    means for directing feed from said reservoir to its said plurality of spaced apertures, said means including a spreader member having an upper section, a conically-shaped middle section, a generally cylindrical lower section, and a tapered outer wall;
    means for closing said lower sections of said reservoir and said spreader member, said means including an inner insert positioned within said generally cylindrical lower section of said spreader member and a hollow sleeve positioned within said cylindrical lower section of said reservoir and outside of said generally cylindrical lower section of said spreader member; and
    bird perch means associated with said hollow sleeve below said plurality of spaced apertures in said reservoir so that birds can comfortably stand thereon to feed.

14. The bird feeder of claim 13 wherein each of said apertures in said lower section of said reservoir is defined by a plurality of spaced, inwardly protruding, tabs.

15. The bird feeder of claim 14 wherein two of said spaced, inwardly protruding, tabs form the side edges of each said aperture.

16. The bird feeder of claim 15 wherein a third one of said spaced, inwardly protruding tabs form the top edge of said aperture.

17. The bird feeder of claim 16 wherein said inwardly protruding tabs prevent feed within said reservoir from falling from said reservoir through said apertures and being wasted.

18. The bird feeder of claim 17 wherein said hollow outer sleeve includes an inner opening and said means for closing said lower sections of said reservoir and said inner spreader member further includes a floor mounted within said inner opening of said hollow sleeve.

19. The bird feeder of claim 18 wherein each of said outer sleeve and said floor includes a plurality of radially extending openings for receiving said bird perch means.

20. The bird feeder of claim 19 wherein said bird perch means comprise a plurality of pegs.

* * * * *